United States Patent
Seidle, Jr. et al.

(10) Patent No.: US 9,648,078 B2
(45) Date of Patent: May 9, 2017

(54) IDENTIFYING A BROWSER FOR RENDERING AN ELECTRONIC DOCUMENT

(71) Applicant: Teachers Insurance and Annuity Association of America, New York, NY (US)

(72) Inventors: John R. Seidle, Jr., Ewing, NJ (US); Rodney W. Bass, Princeton, NJ (US); John Knam, Old Bridge, NJ (US); Yogesh Dnyandeo Khachane, Iselin, NJ (US); Scott M. Blandford, Hopewell, NJ (US); Andrew Eugene Kettering, Westford, MA (US)

(73) Assignee: Teachers Insurance and Annuity Association, New York, NY (US)

( * ) Notice: Subject to any disclaimer, the term of this patent is extended or adjusted under 35 U.S.C. 154(b) by 356 days.

(21) Appl. No.: 14/271,880

(22) Filed: May 7, 2014

(65) Prior Publication Data
US 2015/0324479 A1    Nov. 12, 2015

(51) Int. Cl.
G06F 17/00    (2006.01)
H04L 29/08    (2006.01)
G06F 17/30    (2006.01)

(52) U.S. Cl.
CPC ........ *H04L 67/02* (2013.01); *G06F 17/30905* (2013.01)

(58) Field of Classification Search
CPC ... G06F 17/30; G06F 17/30905; H04L 29/08; H04L 67/02
See application file for complete search history.

(56) References Cited

U.S. PATENT DOCUMENTS

2014/0101236 A1* 4/2014 Dietrich ................ H04L 67/146
                                                        709/203
2014/0108496 A1* 4/2014 Heller ............... G06F 17/30864
                                                        709/203
2015/0319479 A1* 11/2015 Mishra ............... G06Q 30/0277
                                                        725/32

* cited by examiner

*Primary Examiner* — Stephen Hong
*Assistant Examiner* — Marshon Robinson
(74) *Attorney, Agent, or Firm* — Lowenstein Sandler LLP

(57) ABSTRACT

Systems and methods for identifying a browser for rendering an electronic document. An example method may comprise: intercepting, by a software component being executed by a computer system within a context of a first browser, a procedure call to open a new browser window for rendering an electronic document; identifying, in view of an identifier of the electronic document, a second browser; and causing the second browser to render the electronic document.

15 Claims, 5 Drawing Sheets

IDENTIFYING A BROWSER FOR RENDERING AN ELECTRONIC DOCUMENT

TECHNICAL FIELD

The present disclosure is generally related to computer systems, and is more specifically related to computer systems executing browsers for rendering electronic documents.

BACKGROUND

"Web browser" or "browser" herein shall refer to a software application for retrieving, presenting and navigating through information resources represented by various electronic documents. Many common browsers support simultaneous rendering, in several browser windows and/or in several tabs of the same window, of multiple electronic documents pertaining to different information resources.

An information resource may be provided by a web application. "Web application" herein shall refer to a software application having a client part that is designed to run in a web browser. The client part may be created in a browser-supported programming language (such as JavaScript, HTML, or their combination) and thus may rely on a web browser to render its output and/or receive GUI-based user input. Common web applications include webmail, online retail sales, online auctions, information portals, etc.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
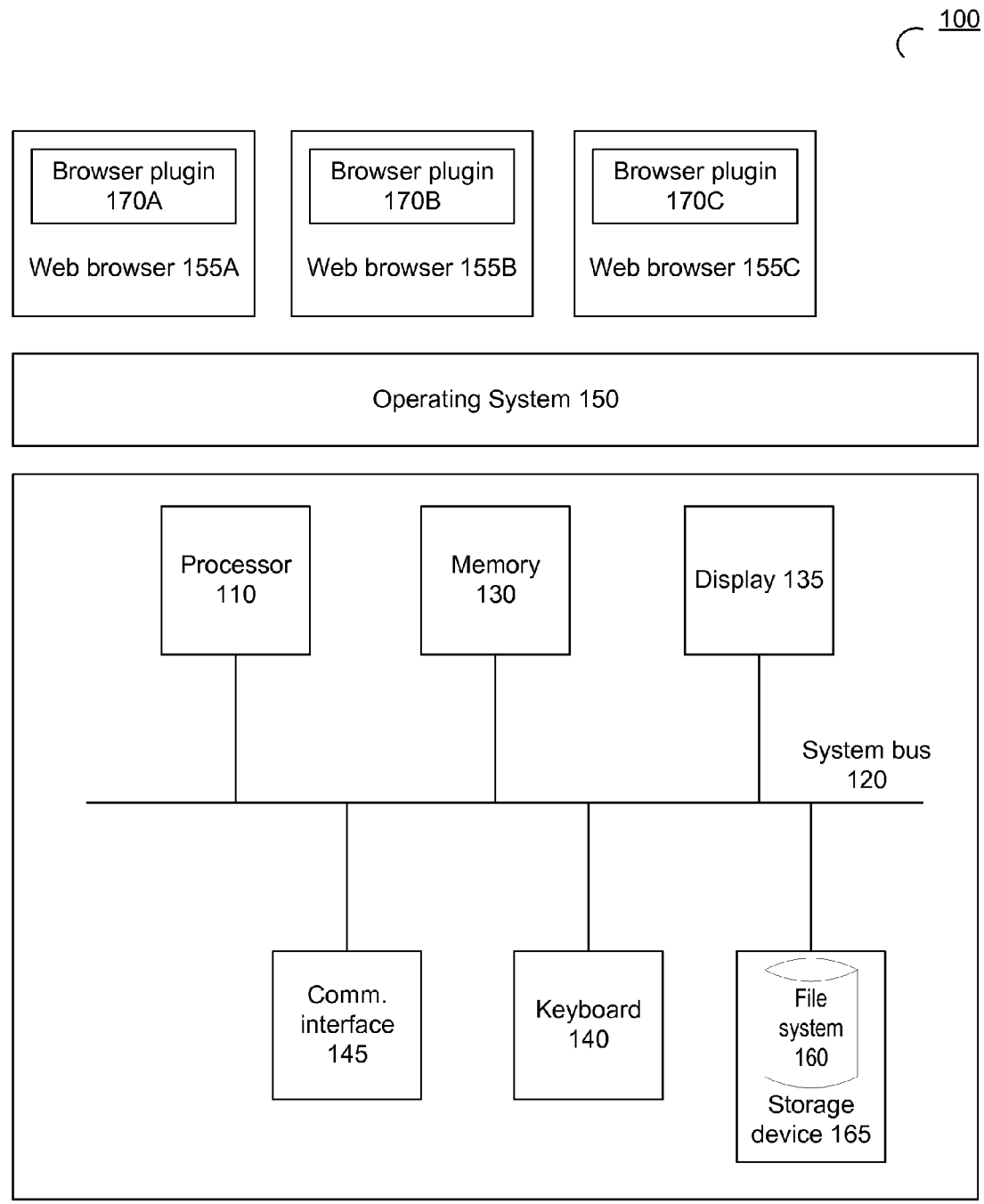
FIG. 1 schematically illustrates a block diagram of an example computer system operating in accordance with one or more aspects of the present disclosure.

Described herein are methods and systems for identifying a browser for rendering an electronic document. In illustrative examples, electronic documents may pertain to various business and/or consumer-oriented web applications.

In certain implementations, web applications may be referenced by hyperlinks contained within web pages rendered by a single sign-on portal and containing collections of hyperlinks to various web applications. Furthermore, certain web applications may be mutually integrated and thus mutually reference each other by hyperlinks that may be dynamically incorporated into web pages rendered by such applications. When a user clicks on such a hyperlink, a web page rendered by the referenced web application may be opened in a new browser window.

While certain browsers support a common set of standards and features, the browsers may nevertheless differ in supporting various advanced features. For example, Firefox® and Microsoft Internet Explorer® (MSIE) may differ in rendering markup and/or scripting language code fragments containing certain markup and/or scripting language constructs. Thus, certain web applications may be designed to be executed by a particular browser.

In accordance with one or more aspects of the present disclosure, a client computer system may have two or more browsers installed, and may be configured to automatically open each of a plurality of web applications in a browser designated for the particular web application.

In certain implementations, a browser plugin represented by a software component being executed within the context of a running browser may intercept procedure calls to open new browser windows. In various illustrative examples, the browser plugin may be configured to intercept window.open( ) calls that may be provided by a software module having an interface compatible with the browser in the context of which the browser plugin is intended to be executed, e.g., a browser helper object for MSIE, or an XPCOM object for Firefox.

In certain implementations, the browser plugin may be configured to identify, upon the plugin initialization, the browsers that are installed on the client computer system executing the browser plugin (e.g., by inspecting MS Windows® registry and/or other local configuration data sources). Responsive to intercepting a window.open( ) call, the browser plugin may identify the browser to open the new window based on parameters of the window.open( ) call, a centrally managed plugin configuration file, and/or the configuration of the computer system executing the browser.

In an illustrative example, the browser plugin may identify the browser to open the new window based on the Uniform Resource Identifier (URI) referencing the electronic document to be rendered in the new browser window, by matching the URI specified by the window.open( ) call to various URI patterns associated with certain web applications. In another illustrative example, the browser plugin may identify the browser to open the new window based on the window name, by matching the window name specified by the window.open( ) call to various window name patterns associated with certain web applications.

In certain implementations, the URI patterns and/or window name patterns may be stored in a configuration file, which may contain a plurality of records such that each record may map one or more URI patterns to a certain web application. The configuration file may be centrally managed and stored on a network file system volume accessible by multiple client computer systems. In an illustrative example, the configuration file may be also cached by a client computer system in a local file system.

Responsive to identifying the browser, the browser plugin may open a new window or use an existing window of the identified browser for rendering the electronic document identified by the intercepted window.open( ) call.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 depicts a block diagram of one illustrative example of a computer system 100 operating in accordance with one or more aspects of the present disclosure. In illustrative examples, the computer system 100 may be provided by various devices, such as a tablet computer, a smart phone, a notebook computer, or a desktop computer.

The computer system 100 may comprise a processor 110 coupled to a system bus 120. Other devices coupled to the system bus 120 may include a memory 130, a display 135, a keyboard 140, and one or more communication interfaces 145. The term "coupled" herein shall include both electrically connected and being capable of communicating, either directly or via one or more interface devices, adapters and the like. At least one of communication interfaces 145 may be provided by a network interface card (NIC) communicatively coupled to at least one communication network (not shown in FIG. 1).

The processor 110 may be provided by one or more processing devices including general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks).

The computer system 100 may further comprise one or more file systems 160 residing on one or more local storage devices 165 and/or one or more external storage devices (not shown in FIG. 1) accessible via one or more communication networks to which the computer system 100 may be communicatively coupled via one or more communication interfaces 145.

The computer system 100 may execute an operating system 150 and one or more software applications, including one or more browsers 155A-155C. Browsers 155A-155C may be provided by general purpose common browsers such as Microsoft Internet Explorer® (MSIE), FireFox®, Google Chrome®, Safari® and/or custom software application providing browsing functionality, including retrieving, presenting and navigating through information resources represented by various electronic documents.

Each of one or more browsers 155A-155C may comprise various browser plugins represented by software components designed to be executed within the context of the browser (e.g., as part of the same process as the browser process, or as a child thread or a child process created by the browser process). In certain implementations, the software components may have interfaces compatible with the browser in the context of which a particular software component is intended to be executed, e.g., a browser helper object for MSIE, or an XPCOM object for Firefox.

In certain implementations, each of one or more browsers 155A-155C may comprise a browser plugin 170A-170C designed to intercept certain procedure calls (e.g., window.open( ) calls) and open a new window in another browser. A browser plugin may identify, based on parameters of the window.open( ) call, a centrally managed configuration file, and/or the configuration of the computer system executing the browser, a browser in which the window should be opened, as described in more details herein below.

In certain implementations, the browser plugin may, responsive to detecting a triggering event, perform certain actions, including identifying the browsers that are installed on the client computer system executing the browser plugin and/or retrieving a configuration file from a network file system volume or a local cache. In various illustrative examples, the triggering event may be provided by the browser plugin initialization or expiration of a pre-defined timeout.

In an illustrative example, the browser plugin may, responsive to detecting a triggering event, identify the installed browsers by inspecting MS Windows® registry and/or other local configuration data sources. In another illustrative example, the browser plugin may identify the installed browsers by searching one or more pre-defined file names in the local file system.

In certain implementations, the browser plugin may, responsive to detecting a triggering event, retrieve a configuration file from a network file system volume or a local cache. In an illustrative example, the browser plugin may only retrieve the configuration file from a network file system volume responsive to determining that the locally cached version of the configuration file has expired. In another illustrative example, the browser plugin may only retrieve the locally cached version of the configuration file responsive to determining that the configuration file residing on a network file system volume is not available.

Responsive to intercepting a window.open( ) call, the browser plugin may identify the browser to open the new window based on parameters of the window.open( ) call, a centrally managed configuration file, and/or the configuration of the computer system executing the browser, as described in more details herein below with references to FIGS. 2A-2B.

In an illustrative example, the browser plugin may identify the browser to open the new window based on the Uniform Resource Identifier (URI) referencing the electronic document to be rendered in the new browser window, by matching the URI specified by the window.open( ) call to various URI patterns associated with certain web applications. In another illustrative example, the browser plugin may identify the browser to open the new window based on the window name, by matching the window name specified by the window.open( ) call to various window name patterns associated with certain web applications.

Figure 2A:
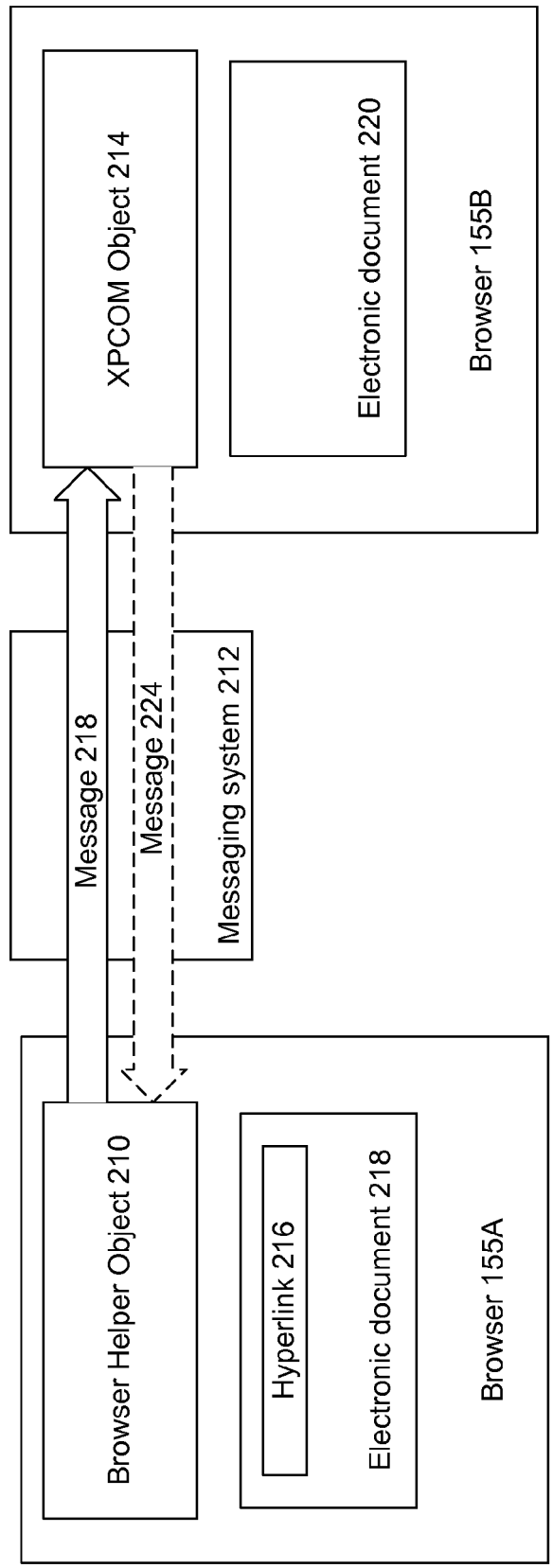
FIGS. 2A-2B schematically illustrate various examples or intercepting and handling procedure calls to open new browser windows, in accordance with one or more aspects of the present disclosure.

In the illustrative example of FIG. 2A, a first browser plugin (e.g., represented by a browser helper object 210) being executed within the context of a first browser 155A (e.g., MSIE) may be configured to communicate, via a messaging system 212, with a second browser plugin (e.g., represented by an XPCOM object 214) being executed within the context of a second browser 155B (e.g., FireFox®). In an illustrative example, the messaging system 212 may be provided by a Simple Message Queue (SMQ). Alternatively, the messaging system 212 may be provided by other inter-process communications (IPC) means.

In an illustrative example, the browser helper object 210 may intercept a window.open( ) call triggered by a user interface event associated with a hyperlink 216 incorporated into an electronic document 218 being rendered by the browser 155A. Responsive to intercepting the window.open( ) call, the browser helper object 210 may determine (e.g., by URI pattern matching and/or window name pattern matching, as described in more details herein above) that the electronic document 220 referenced by the hyperlink 216 should be rendered within a window of the browser 155B.

The browser helper object 210 may then determine whether an instance of the browser 155B is currently running. Responsive to determining that no instances of the browser 155B are currently running, the browser helper object 210 may launch a new instance of the browser 155B.

In certain implementations, the browser helper object 210 may inspect a memory data structure comprising identifiers of running browsers and/or identifiers of active browser windows. In an illustrative example, the memory data structure may comprise a plurality of records mapping window handles of open browser windows to unique window identifiers assigned to browser windows by the browser helper object 210. In certain implementations, the browser helper object 210 may inspect the memory data structure to identify a browser window associated with the electronic document 220 referenced by the hyperlink 216.

Responsive to identifying an open browser window associated with the electronic document 220, the browser helper object 210 may send, via the messaging system 212, a message 218 to the XPCOM object 214 associated with the browser 155B. The message 218 may comprise the unique identifier of the identified browser window and the parameters of the intercepted window.open( ) call. Responsive to receiving the message, the XPCOM object 214 may render, in the specified browser window, an electronic document 220 identified by the parameters of window.open( ) call.

Alternatively, responsive to determining that no open browser windows are associated with the electronic document 220 referenced by the hyperlink 216, the browser helper object 210 may send, via the messaging system 212, a message 218 to the XPCOM object 214. The message may comprise the parameters of the intercepted window.open( ) call. In certain implementations, the message may further comprise a unique identifier assigned by the browser helper object 210 to the new browser window. Responsive to receiving the message, the XPCOM object 214 may open a new browser window by executing a window.open( ) call with the parameter values specified by the message. In certain implementations, the XPCOM object 214 may further send, to the browser helper object 210, a response message 224 comprising a window handle for the newly opened window. Upon to receiving the response message, the browser helper object 210 may store, in the memory data structure, a mapping of the window handle to the unique window identifier.

Figure 2B:
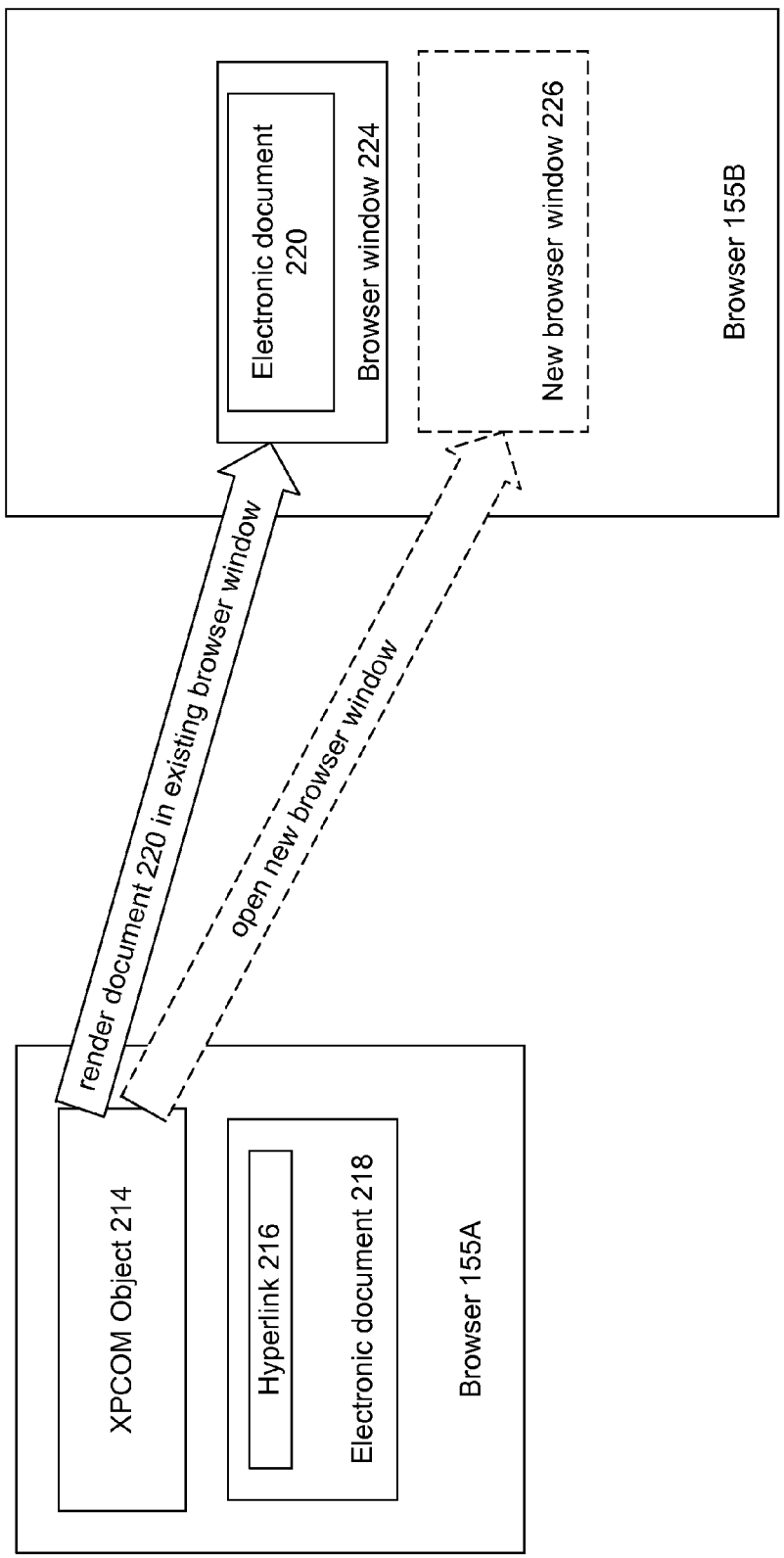

In the illustrative example of FIG. 2B, a first browser plugin (e.g., represented by an XPCOM object 214) being executed within the context of a first browser 155A (e.g., Firefox®) may intercept a window.open( ) call triggered by a user interface event associated with a hyperlink 216 incorporated into an electronic document 218 being rendered by the browser 155A. Responsive to intercepting the window.open( ) call, the XPCOM object 214 may determine (e.g., by URI pattern matching and/or window name pattern matching, as described in more details herein above) that the electronic document 220 referenced by the hyperlink 216 should be rendered within a window of the browser 155B.

The XPCOM object 214 may then determine (e.g., by window name pattern matching) whether an open browser window exists associated with the electronic document 220 referenced by the hyperlink 216. Responsive to identifying an open window 224 associated with the electronic document 220, the XPCOM object 214 may open the electronic document 220 in the identified browser window 224. Alternatively, responsive to determining that no open browser windows are associated with the electronic document 220, the XPCOM object 214 may create a new window 226 of the browser 155B and open the electronic document 220 in the newly created browser window 226.

The above described methods serve as illustrative examples only and do not in any way limit the scope of the present disclosure. Various other browsers, software interfaces, scripting languages, markup languages, and/or messaging standards may be compatible with the methods and systems for identifying a browser for rendering an electronic document.

Figure 3:
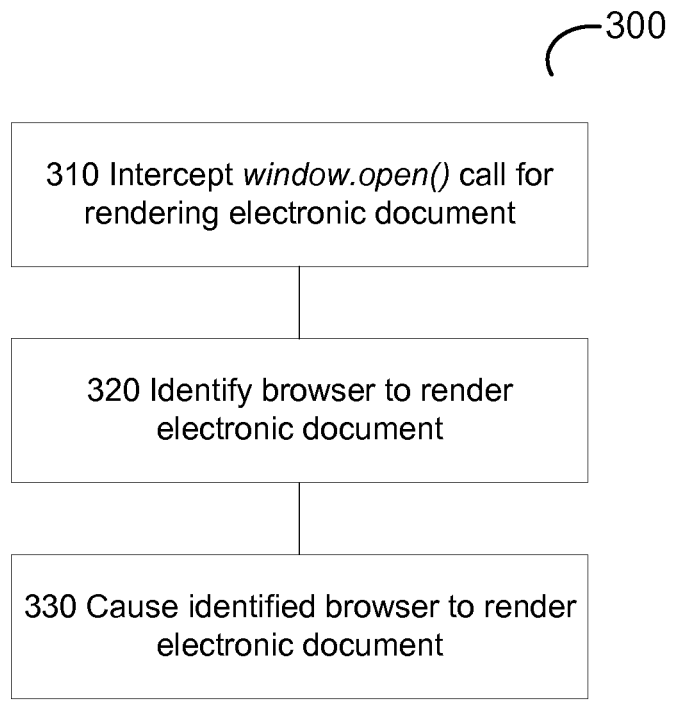
FIG. 3 depicts a flow diagram of an example method for identifying a browser for rendering an electronic document, in accordance with one or more aspects of the present disclosure.

FIG. 3 depicts a flow diagram of an example method 300 for identifying a browser for rendering an electronic document, in accordance with one or more aspects of the present disclosure. Method 300 and/or each of its individual functions, routines, subroutines, or operations may be performed by one or more general purpose and/or specialized processing devices. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by an example computer system 500 described herein below with references to FIG. 4.

Referring to FIG. 3, at block 310, a software component being executed by the processing device within a context of a first browser may intercept a procedure call to open a new browser window for rendering an electronic document. In an illustrative example, the identifier of the electronic document may comprise a Uniform Resource Identifier (URI).

At block 320, the processing device may identify, in view of an identifier of the electronic document, a browser in which the window should be opened. In certain implementations, the processing device may identify the browser to open the new window based on the Uniform Resource Identifier (URI) referencing the electronic document to be rendered in the new browser window, by matching the URI specified by the window.open( ) call to various URI patterns associated with certain web applications. In another illustrative example, the browser plugin may identify the browser to open the new window based on the window name, by matching the window name specified by the window.open( ) call to various window name patterns associated with certain web applications, as described in more details herein above.

In certain implementations, the URI patterns and/or window name patterns may be stored in a configuration file. The processing device may be configured to retrieve the configuration file from an external server and/or or a local file system, as described in more details herein above.

At block 330, the processing device may cause the identified browser to render the electronic document. In an illustrative example, responsive to determining that the identified browser is not running on the computer system, the processing device may launch a new instance of the identified browser. In certain implementations, the processing device may send, to the identified browser, a message comprising the identifier of the electronic document and/or or a name of a window for rendering the electronic document, as described in more details herein above. Responsive to completing operations referenced by the block 330, the method may terminate.

Figure 4:
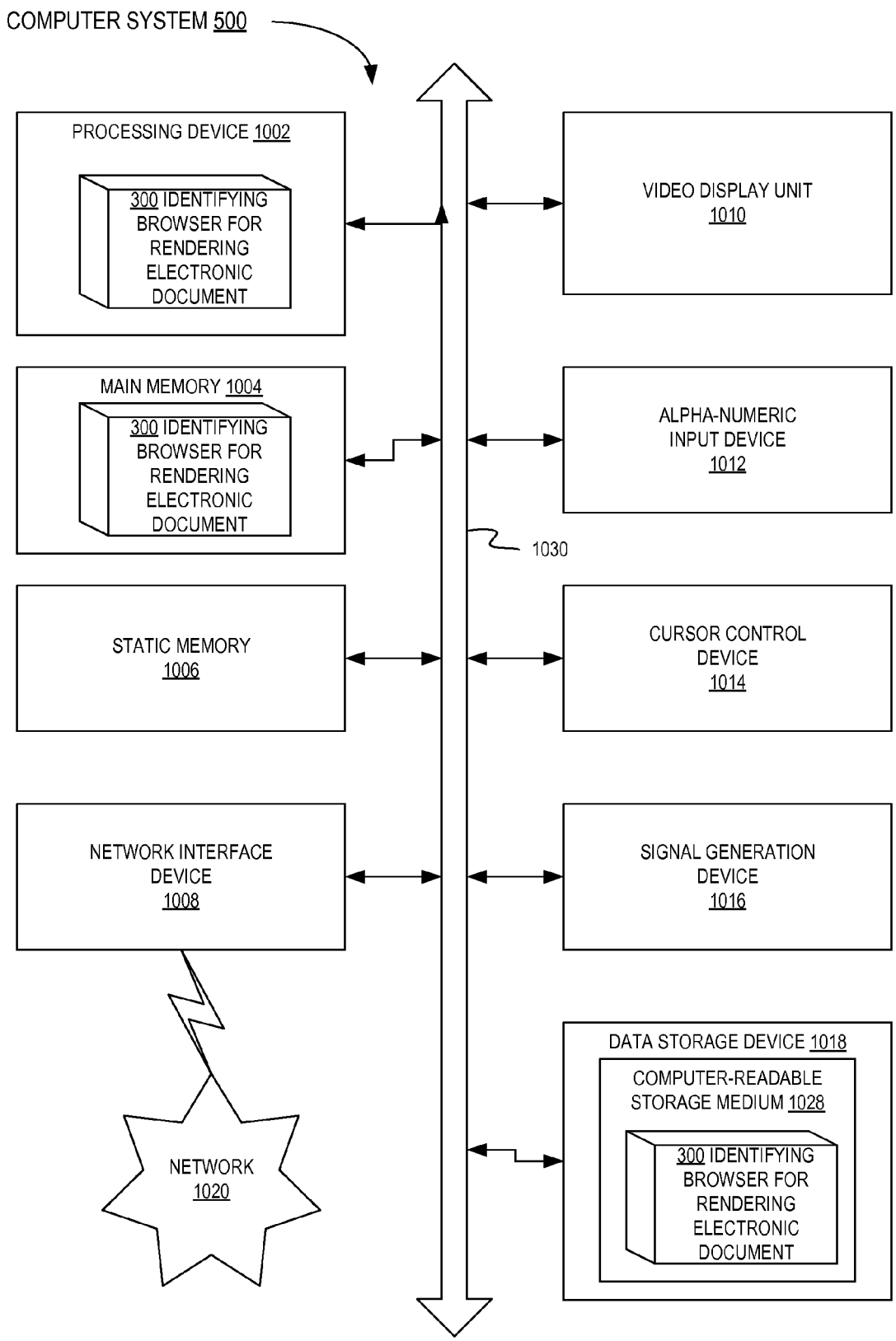
FIG. 4 depicts a hardware component diagram of an illustrative computer system for executing an example method for identifying a browser for rendering an electronic document, in accordance with one or more aspects of the present disclosure.

FIG. 4 illustrates a hardware component diagram of a computer system 500 for executing a set of instructions implementing the methods discussed herein (e.g., method 300 for identifying a browser for rendering an electronic document). The computer system 500 may be connected to other computing devices in a LAN, an intranet, an extranet, and/or the Internet. The computer system 500 may operate in the capacity of a server machine in client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may implement the above described method 300 for identifying a browser for rendering an electronic document.

The example computer system 500 may include a processing device (e.g., a general purpose processor) 1002, a main memory 1004 (e.g., synchronous dynamic random access memory (DRAM), read-only memory (ROM)), a static memory 1006 (e.g., a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the method 300 for identifying a browser for rendering an electronic document, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 300 for identifying a browser for rendering an electronic document, in accordance with one or more aspects of the present disclosure) implementing any one or more of the methods or functions described herein. Instructions implementing the method 300 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   intercepting, by a software component being executed by a computer system within a context of a first browser, a procedure call to open a new browser window for rendering an electronic document;
   identifying, in view of an identifier of the electronic document, a second browser;
   responsive to failing to identify, in a memory data structure referencing a plurality of browser windows, an active window associated with the second browser, causing a new instance of the second browser to be created;
   sending a first message comprising the identifier of the electronic document to a second software component being executed within a context of the second browser, to cause the new instance of the second browser to render the electronic document; and responsive to receiving, from the running instance of the second browser, a second message identifying a window associated with the new instance of the second browser, appending to the memory data structure a new record referencing the identified window.

2. The method of claim 1, wherein the identifier of the electronic document comprises a Uniform Resource Identifier (URI).

3. The method of claim 2, wherein identifying the second browser comprises matching the URI with a pre-defined URI pattern.

4. The method of claim 3, wherein the pre-defined URI pattern is stored in a configuration file.

5. The method of claim 4, further comprising:
retrieving the configuration file from one of: an external server or a local file system.

6. The method of claim 1, further comprising:
identifying one or more browsers installed on the computer system.

7. A system, comprising:
a memory; and
one or more processors coupled to the memory, the processors to:
intercept, by a software component being executed within a context of a first browser, a procedure call to open a new browser window for rendering an electronic document;
identify, in view of an identifier of the electronic document, a second browser;
responsive to failing to identify, in a memory data structure referencing a plurality of browser windows, an active window associated with the second browser, cause a new instance of the second browser to be created;
send a first message comprising the identifier of the electronic document to a second software component being executed within a context of the second browser, to cause the new instance of the second browser to render the electronic document; and
responsive to receiving, from the running instance of the second browser, a second message identifying a window associated with the new instance of the second browser, append to the memory data structure a new record referencing the identified window.

8. The system of claim 7, wherein the identifier of the electronic document comprises a Uniform Resource Identifier (URI).

9. The system of claim 8, wherein identifying the second browser comprises matching the URI with a pre-defined URI pattern.

10. The system of claim 9, wherein the pre-defined URI pattern is stored in a configuration file.

11. A computer-readable non-transitory storage medium comprising executable instructions that, when executed by a computer system, cause the computer system to perform operations comprising:
intercepting, by a software component being executed by a computer system within a context of a first browser, a procedure call to open a new browser window for rendering an electronic document;
identifying, in view of an identifier of the electronic document, a second browser;
responsive to failing to identify, in a memory data structure referencing a plurality of browser windows, an active window associated with the second browser, causing a new instance of the second browser to be created;
sending a first message comprising the identifier of the electronic document to a second software component being executed within a context of the second browser, to cause the new instance of the second browser to render the electronic document; and
responsive to receiving, from the running instance of the second browser, a second message identifying a window associated with the new instance of the second browser, appending to the memory data structure a new record referencing the identified window.

12. The computer-readable non-transitory storage medium of claim 11, wherein the identifier of the electronic document comprises a Uniform Resource Identifier (URI).

13. The computer-readable non-transitory storage medium of claim 12, wherein identifying the second browser comprises matching the URI with a pre-defined URI pattern.

14. The computer-readable non-transitory storage medium of claim 13, wherein the pre-defined URI pattern is stored in a configuration file.

15. The computer-readable non-transitory storage medium of claim 11, further comprising executable instructions causing the computer system to:
identify one or more browsers installed on the computer system.

* * * * *

UNITED STATES PATENT AND TRADEMARK OFFICE
CERTIFICATE OF CORRECTION

PATENT NO. : 9,648,078 B2
APPLICATION NO. : 14/271880
DATED : May 9, 2017
INVENTOR(S) : John R. Seidle, Jr. et al.

It is certified that error appears in the above-identified patent and that said Letters Patent is hereby corrected as shown below:

On the Title Page

Item (73) the Assignee name reading:
--Teachers Insurance and Annuity Association (New York, NY)--

Should read:
--Teachers Insurance and Annuity Association of America (New York, NY)--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*